T 867003

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED OCTOBER 21, 1969

867 O.G. 747

650,859

METHOD OF PRODUCING A TWO-COMPONENT FLOCKED PRODUCT

Robert L. Combs and Harry W. Coover, Jr., both of P.O. Box 511, Kingsport, Tenn. 37662

Filed July 3, 1967. Published Oct. 21, 1969
Int. Cl. B29d *9/08;* B32b *27/14*
U.S. Cl. 264—24
1 Sheet Drawing. 15 Pages Specification

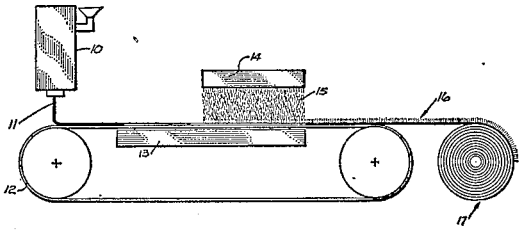

A two-component flocked product is prepared by extruding a thermoplastic material in sheet form onto a continuously moving endless belt of any suitable material which will resist heat and permit adequate operation of subsequent electrostatic flocking equipment. After the thermoplastic sheet has been extruded and deposited on the continuously moving belt, the sheet is preferably exposed to a series of heaters so as to maintain it in the molten state while it is being subjected to the flocking step. Subsequently, the molten state thermoplastic sheet passes through suitable electrostatic flocking equipment, well known in the art, whereby relatively short length fibers or flock are embedded within the molten state portions of the thermoplastic sheet so as to provide a two component flocked product. Thereafter, the flocked product is cooled by any suitable means, such as exposure to the atmosphere, and is thereafter wound about a core into an end product package.

Oct. 21, 1969 R. L. COMBS ETAL 650859 T867003 DEF. PUB.
METHOD OF PRODUCING A TWO-COMPONENT FLOCKED PRODUCT
Filed July 3, 1967
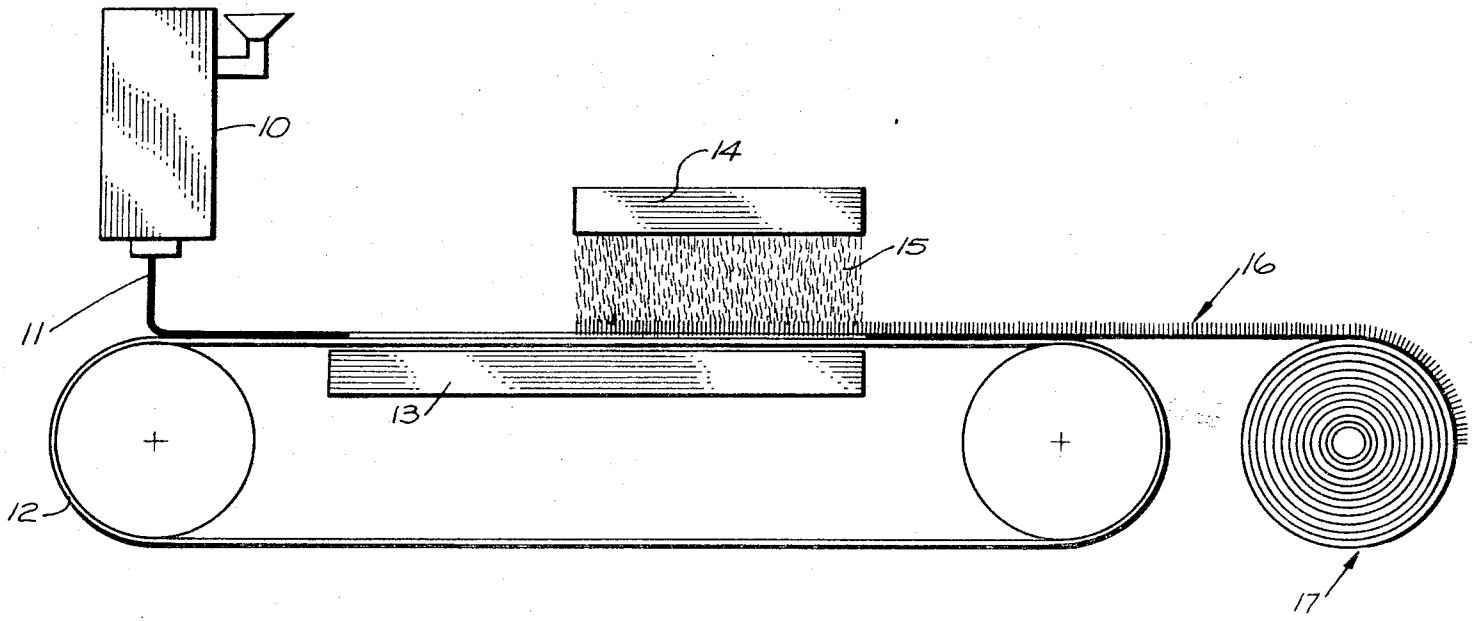
Robert L. Combs
Harry W. Coover, Jr.
INVENTORS
BY William T. French
George P. Chandler
ATTORNEYS